United States Patent
Hino et al.

(10) Patent No.: US 6,907,543 B2
(45) Date of Patent: Jun. 14, 2005

(54) DATA STORAGE SYSTEM (75) Inventors: Naoki Hino, Hiratsuka (JP); Kiichiro Urabe, Isehara (JP); Toshio Nakano, Chigasaki (JP)

(73) Assignee: Hitachi, Ltd., Tokyo (JP)

(*) Notice: Subject to any disclaimer, the term of this patent is extended or adjusted under 35 U.S.C. 154(b) by 530 days.

(21) Appl. No.: 10/039,849

(22) Filed: Oct. 19, 2001

(65) Prior Publication Data
US 2003/0046602 A1 Mar. 6, 2003

(30) Foreign Application Priority Data
Sep. 4, 2001 (JP) .......................... 2001-266629

(51) Int. Cl.[7] .............................................. G06F 11/20
(52) U.S. Cl. ........................... 714/4; 714/5; 714/6; 714/7
(58) Field of Search ............................... 714/4, 5, 6, 7

(56) References Cited

U.S. PATENT DOCUMENTS

| | | | |
|---|---|---|---|
| 4,484,267 A | 11/1984 | Fletcher | |
| 5,210,848 A | 5/1993 | Liu | |
| 5,742,792 A | * 4/1998 | Yanai et al. | 714/5 |
| 5,812,748 A | * 9/1998 | Ohran et al. | 714/4 |
| 5,812,751 A | * 9/1998 | Ekrot et al. | 714/4 |
| 5,845,328 A | * 12/1998 | Maya et al. | 714/5 |
| 6,542,961 B1 | 4/2003 | Matsunami et al. | |
| 6,560,617 B1 | * 5/2003 | Winger et al. | 714/4 |
| 6,671,704 B1 | * 12/2003 | Gondi et al. | 714/4 |
| 6,681,339 B2 | * 1/2004 | McKean et al. | 714/5 |
| 2002/0091898 A1 | 7/2002 | Matsunami et al. | |
| 2002/0095549 A1 | 7/2002 | Matsunami et al. | |

* cited by examiner

Primary Examiner—Scott Baderman
Assistant Examiner—Joseph Manoskey
(74) Attorney, Agent, or Firm—Townsend and Townsend and Crew LLP

(57) ABSTRACT

The present invention is a control technique for a data storage system, for performing exclusive control of duplicated volumes generated among separately established storage devices having a remote copy function, and uniquely determining the host device having exclusive control of duplicated volumes.

7 Claims, 9 Drawing Sheets

OPERATION OF PAIRED VOLUME CONTROL SOFTWARE
[OTHER THAN RESERVE COMMAND]

FIG.3

PAIRED VOLUME STATE TRANSITIONS

FIG.4

RESPONSE FROM STORAGE DEVICE WHEN THE PAIR RESYNCHRONIZATION COMMAND IS ISSUED

| COMMAND EXECUTED | VOLUME ATTRIBUTES | | RESPONSE OF STORAGE DEVICE |
|---|---|---|---|
| PAIR RESYNCHRO-NIZATION | NON-PAIRED VOLUME | | ABNORMAL END |
| | P-VOL | COPYING IN PROGRESS | ABNORMAL END |
| | | PAIRED STATE | ⌐130 |
| | | SUSPEND STATE (NORMAL) | NORMAL END |
| | | SUSPEND STATE (ABNORMAL) | ABNORMAL END |
| | S-VOL | COPYING IN PROGRESS | ABNORMAL END |
| | | PAIRED STATE | |
| | | SUSPEND STATE (NORMAL) | |
| | | SUSPEND STATE (ABNORMAL) | |
| PAIR SWAP RESYNCHRO-NIZATION | NON-PAIRED VOLUME | | ABNORMAL END |
| | P-VOL | COPYING IN PROGRESS | ABNORMAL END |
| | | PAIRED STATE | |
| | | SUSPEND STATE (NORMAL) | |
| | | SUSPEND STATE (ABNORMAL) | |
| | S-VOL | COPYING IN PROGRESS | ABNORMAL END |
| | | PAIRED STATE | ⌐131 |
| | | SUSPEND STATE (NORMAL) | NORMAL END |
| | | SUSPEND STATE (ABNORMAL) | ABNORMAL END |

FIG.5
OPERATION OF PAIRED VOLUME CONTROL SOFTWARE
[RESERVE COMMAND]

ATTRIBUTE OF DETERMINING PAIRED VOLUMES: PAIRED STATE

FIG.10

ATTRIBUTE OF DETERMINING PAIRED VOLUMES: SUSPENDED (NORMAL)

FIG.13

DATA STORAGE SYSTEM

BACKGROUND OF THE INVENTION

1. Field of the Invention

The present invention relates to a control technique for a data storage system comprising two or more separately established host devices.

Furthermore, the present invention relates to an exclusive control technique for duplicated volumes generated between two separately established storage devices having a remote copy function.

2. Description of the Related Art

The various IT technologies for sustaining 24-hour service without a system stoppage are of particular interest to companies promoting e-business development. One of those is clustering, a technology for realizing high availability. This technology is used mainly for systems performing database operations, wherein systems of multiple devices are combined and constructed so that the entire system can work without stopping even when part of the system fails. For example, a small scale system has a constitution using a single shared disk among a plurality of servers and a SCSI interface is used between the servers and the shared disk. If data handled by the plurality of servers is placed on the shared disk in this constitution, another server takes over the data on the shared disk and can continue processing if one server goes down. This is called a fail-over. In a clustering system carrying out a fail-over in this way, operations are carried out so that a client can continue to use a single server.

In order for uniform determination of the host devices for performing fail-over in the clustering system, MSCS (Microsoft cluster server), a clustering product from Microsoft, has a single determining volume, called a quorum resource, for controlling the cluster configuration information.

There is exclusive control of this determining volume and this avoids the problem losing data integrity because of redundant possible error in source processing of a plurality of different processes at the same time on a single resource.

Next is explained a clustering system in the case of two or more host devices and two storage devices connected by a SCSI interface. In the clustering system, the host devices are each connected with a network interface. The host devices monitor each other's operating status by sending messages to each other and performing heartbeat communications.

Furthermore, the clustering system detects when a failure occurs in a host device or in the network interface and heartbeat communications become impossible, and determines whether to continue with resources, applications, and services on another host device. A single determining volume for managing the clustering system is established in the storage devices as the sole element for making that determination.

Generally, in systems using a SCSI interface, one of a plurality of hosts has exclusive control (exclusive use) of a single target (for example, a magnetic disk drive). In such cases, it is possible to reserve a target and have the exclusive use thereof by initially issuing a SCSI reserve command.

In the case where a failure occurs in the host device or in the network interface and heartbeat communications become impossible, each of the host devices, in order to acquire exclusive usage rights in the clustering system, issues a SCSI reserve command to the determining volume and attempts to acquire exclusive usage rights. The host device whose SCSI reserve command to the determining volume was successful takes over all applications and services of other host devices and resources such as disk volumes and executes a fail-over. Meanwhile, the host devices whose SCSI reserve commands to the determining volume failed halt applications and services being performed thereon.

In this way, the clustering system realizes a state where one host device has exclusive use of the determining volume for managing the clustering system.

SUMMARY OF THE INVENTION

Clustering systems have become necessary, particularly in large-scale on-line transaction systems wherein large amounts of data must be processed in real time. These clustering systems support fail-over functions, wherein multiple servers, as well as disk devices and power sources, are provided and even if one fails, another takes over the processing in order that the system not be halted.

With the prior art, the determining volume in the clustering system is constituted by a single disk volume which can be accessed by all host devices.

However, in the clustering systems including a plurality of separately established host devices, the problems of establishing a single determining volume which all host devices can access include the case where the system cannot be constructed due to limits to the distance over which a connection can be formed with the cable for an interface, for example, a SCSI interface etc. of connection between the host devices and the storage device containing the determining volume.

Using a remote copy function, which can construct a disaster backup system and a system for data communications with remote sites, in a clustering system is considered as a means for resolving this.

The remote copy function realizes remote copying between storage devices without passing through host devices (host free). It is possible to ensure the logical integrity of data copied to the remote site in order to protect sequences for reflecting data updates to the remote site. Here, a method is considered wherein paired volumes (called the primary volume and secondary volume; there are a storage device containing the primary volume and a storage device containing the secondary volume) duplicated among separately established storage devices using the remote copy function are generated and, because it is ensured that the primary volume and secondary volume of the pair volume contain the same data, one of the host devices has exclusive use of either the primary volume or secondary volume as the determining volume.

Because each of the separately established systems is a system using a SCSI interface, each of the host devices can have exclusive control of the volume therein and there are two host devices, wherein one host device has exclusive use of the primary volume and one host device has exclusive use of the secondary volume.

Namely, in order to use the primary volume or the secondary volume exclusively, only issuing the SCSI reserve command can not perform an exclusive use of the determining volume because both volumes can be reserved respectively.

As discussed above, in the case of establishing a determining volume using a remote copy function, the primary volume and secondary volume forming the pair are recognized as separate volumes by each host device. In the case where each of the host devices issues a SCSI reserve command to the primary volume and secondary volume, the primary volume and secondary volume can be individually reserved. As a result, a plurality of host devices may operate the same applications and services at the same time and therefore serve not to function as a clustering system.

Consequently, it is an object that paired volumes generated among two storage devices having remote copy functions be recognized as a single determining volume for a clustering system comprising a plurality of host devices, and to realize a method for exclusively determining the host device which can issue update requests to the pertinent paired volumes from among a plurality of host devices in the clustering system. A technique is therefore proposed for the present invention wherein paired volume control software which operates the "state" (attributes) of the paired volumes receives reserve commands which are SCSI commands issued from the clustering software on the host devices, the paired volume control software combines the paired volume control commands issued and issues those commands to the storage devices, and the response of the storage devices to those commands is to end normally only the host device which issued the reserve command first, and thereby enable uniform determination of the host device with exclusive use of the paired volumes.

DESCRIPTION OF THE PREFERRED EMBODIMENTS

An embodiment of the present invention is explained below using the drawings. Moreover, this embodiment uses a clustering system, but the scope of the present invention is not limited to clustering systems.

Also, a clustering system comprising two host devices is used as the embodiment, but three or more host devices may also be used.

Figure 1:
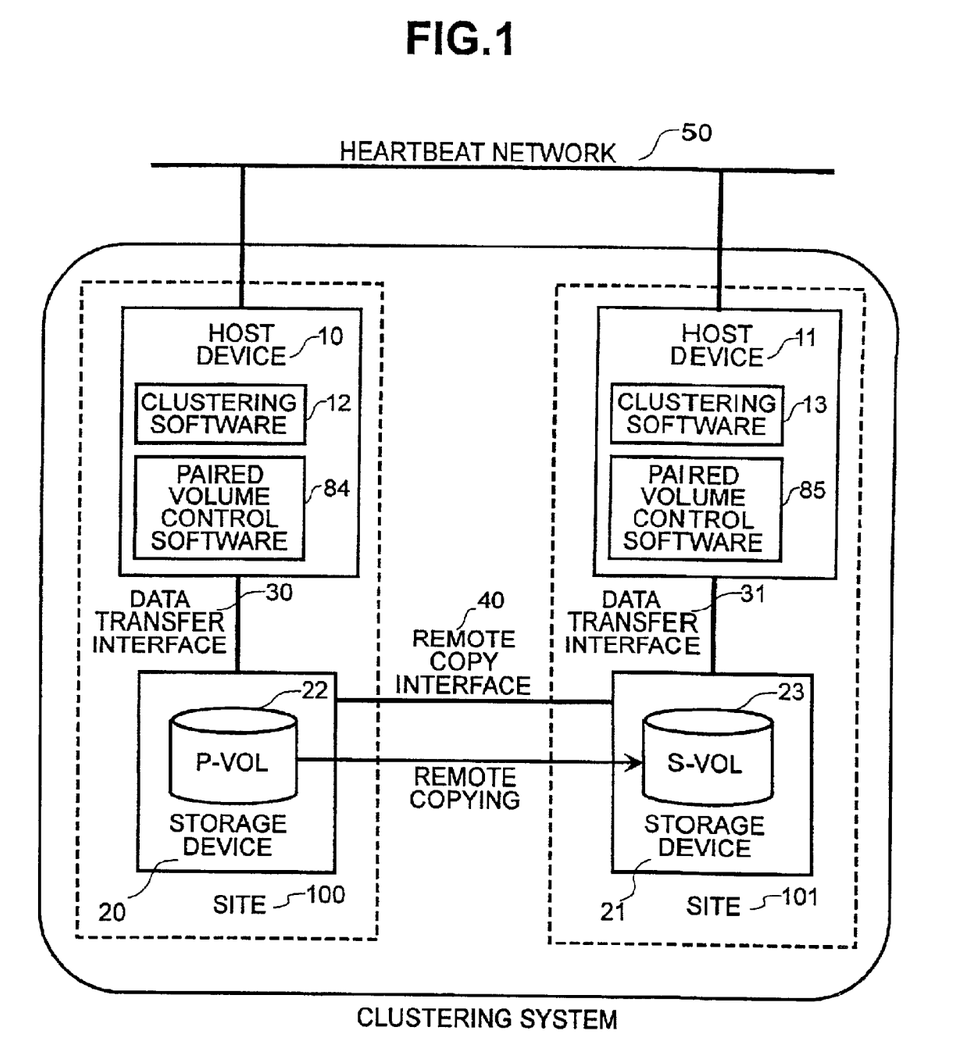
FIG. 1 is a hardware schematic showing an embodiment of the present invention.

FIG. 1 shows an embodiment of the present invention. FIG. 1 is a drawing of a clustering system realized by two or more sites 100, 101, each comprising a host device and storage device, connected by a network interface. 10 and 11 are host devices having CPUs. Clustering software 12, 13, and paired volume control software 84, 85, proposed in the present invention, and so forth, operate on the host devices 10 and 11. Also, the host devices 10 and 11 are connected by a heart beat network 50 and periodically monitor each other's operating situation.

20 and 21 are storage devices storing data from the host devices 10 and 11 and are connected by data transfer interfaces 30 and 31. Also, the storage devices 20 and 21 comprises a plurality of volumes and can receive data update and reference requests from applications installed on the host devices 10 and 11.

Furthermore, the storage devices 20 and 21 have a remote copy function and can construct a mirror of the primary volume (P-VOL) 22 of one storage device on the secondary volume (S-VOL) 23 of the other storage device. Applications running on the storage device 10 perform data update requests on the primary volume (P-VOL) 22 in the storage device 20. Those updated contents are automatically reflected in the secondary volume (S-VOL) 23 in the other storage device through the remote copy interface 40.

Figure 2:
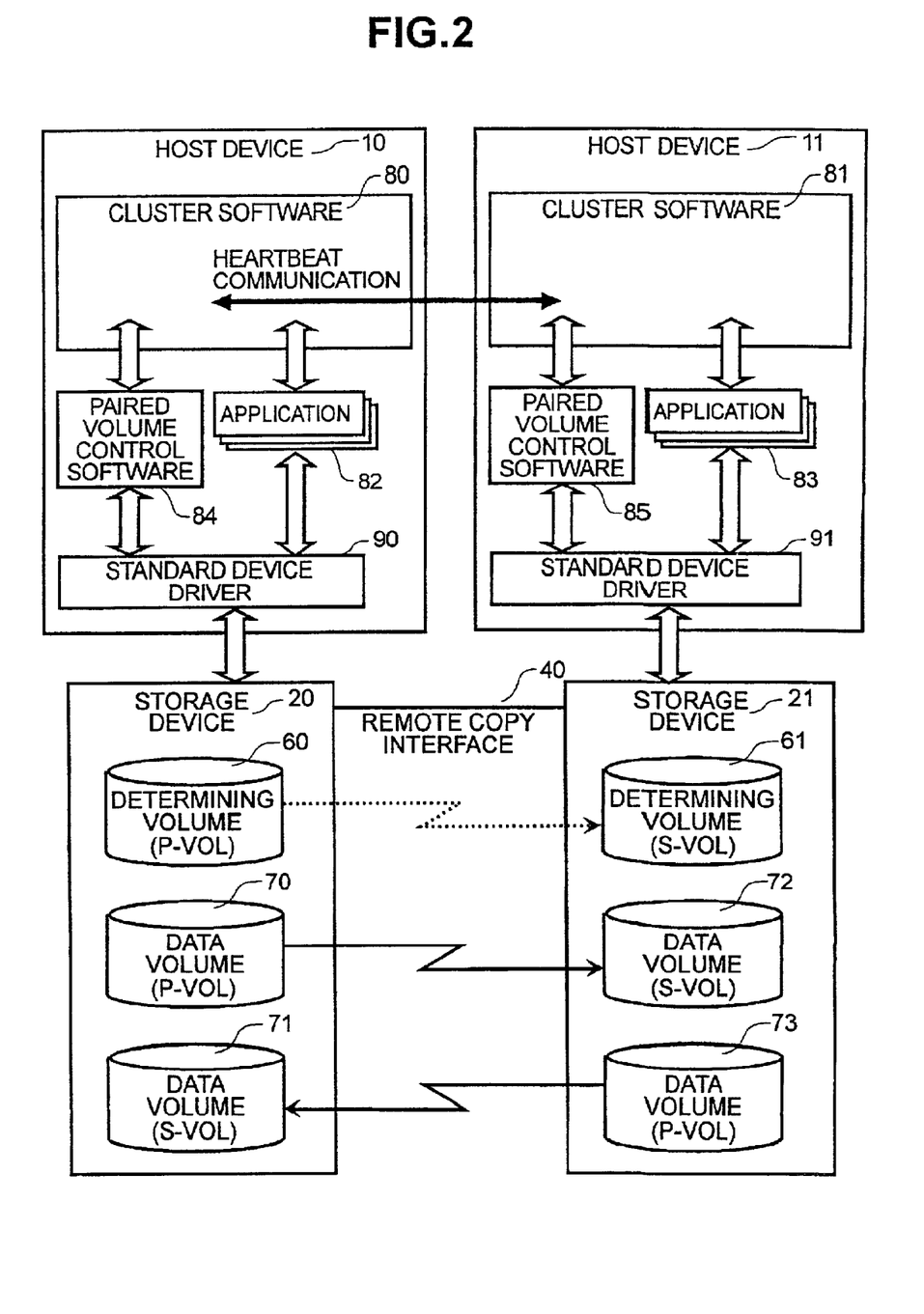
FIG. 2 shows a schematic of a clustering system wherein paired volumes with a remote copy function are used in the determining volume.

FIG. 2 shows the internal structure of a clustering system. The host devices 10 and 11 respectively comprise clustering software 80 and 81, applications 82 and 83, and paired volume control software 84 and 85. The paired volume control software 84 and 85 is located between the cluster software 80 and 81 and the standard device drivers 90 and 91.

The clustering software 80 and 81 issue SCSI commands to the device files independently defined by the paired volume control software 84 and 85. As necessary, the paired volume control software 84 and 85 which received those commands issue commands combined with the paired volume control commands to the determining paired volumes 60 and 61 for managing the clustering system, through the standard device drivers 90 and 91.

Also, the storage devices 20 and 21 comprise determining paired volumes 60 and 61 constructed to ensure exclusive usage rights over the cluster, and data volumes 70 through 73 for storing data for the applications. Each volume is duplicated by the remote copy function and each application can issue update requests only to the primary volume (P-VOL) because of the specifications of the remote copy function.

The cluster software 80 and 81 periodically monitor the operating situation of the other host device by performing heartbeat communications through the network. When heartbeat communications become impossible due to a failure of a host device 10 or 11 or a failure of the heartbeat network 50 (FIG. 1), the cluster software 80 and 81 issue SCSI reserve commands respectively to the determining paired volumes 60 and 61, constructed within the storage devices 20 and 21, through the paired volume control software 84 and 85.

The cluster software which successfully reserved the determining paired volumes takes over all resources and applications registered in the clustering system. The clustering software which failed to reserve the determining paired volumes releases resources and halts applications.

Figure 3:
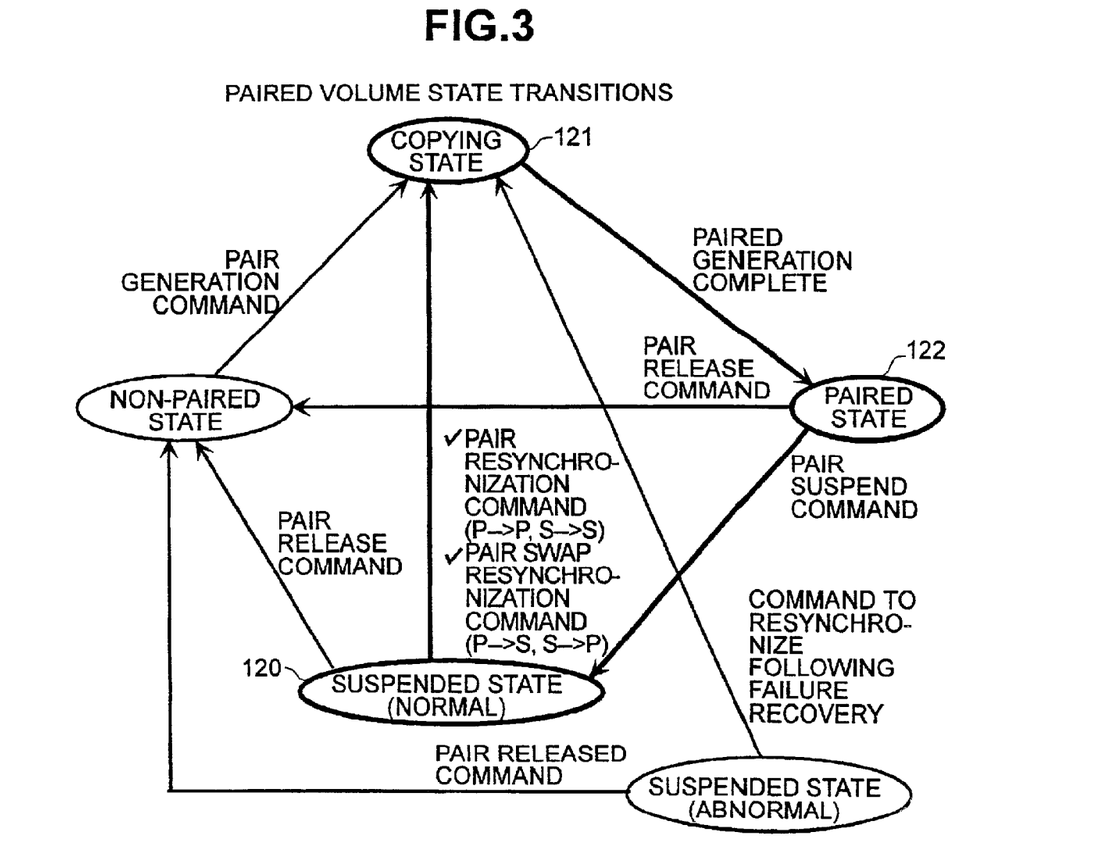
FIG. 3 shows the state transition of the paired volumes.

The state transition of the paired volumes shown in FIG. 3 is explained in detail. Each of the paired volumes generated by the remote copy function temporarily has one of the following states: non-paired state, copying state, paired state, suspended state (normal), and suspended state (abnormal). When the paired volume control software installed on the host devices issues paired volume control commands to the storage devices, this causes the automatic transmission of the state of each of the paired volumes through the remote copy interface 40.

The non-paired state is the state where a pair is not formed between two volumes. The copying state is the state where the data of the paired volumes is not yet completely identical during copying between two volumes from the primary volume to the secondary volume. When copying is complete, the volumes change to the paired state.

In the paired state, all of the updates from the host device to the primary volume are duplicated in the secondary volume. The suspended state (normal) is the state where updates to the primary volume are not reflected in the secondary volume. For example, when it is desired to update only the primary volume in the paired volumes, the primary and secondary volumes are set to this state.

Unlike the abovementioned state, the suspended state (abnormal) is the state to which the primary and secondary volumes are set when updates to the contents cannot be sustained between the volumes upon the detection of some type of failure. The paired volume control commands for transitioning the state of each paired volume can be executed from a host device connected to either the primary volume or secondary volume.

For example, when the paired volumes are in the suspended state (normal), the pair resynchronization command can be executed from the host device on the primary volume side and cause a transition to the paired state. It is also possible to execute the pair resynchronization command from the host device on the secondary volume side and transition to the paired state. Furthermore, it is also possible to execute the pair swap resynchronization command from the host device on the secondary volume side and swap the secondary volume with the primary volume and transition to the paired state.

The result of executing the pair volume control command is dependent on the state of the paired volume from which it is executed. This is explained in detail below.

Figure 4:
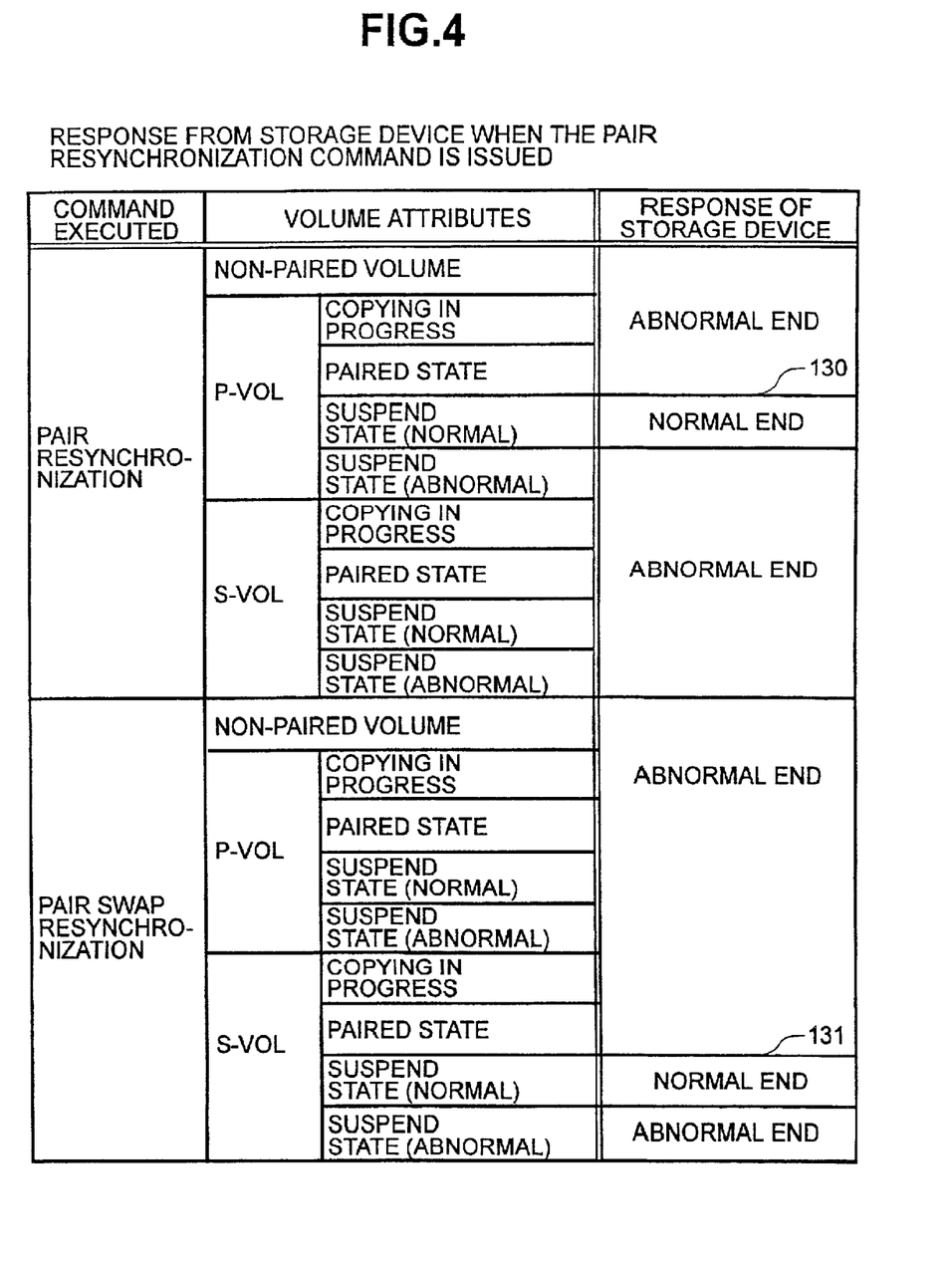
FIG. 4 shows the response from the storage devices corresponding to each volume attribute in the case of issuing a pair resynchronization command or pair swap resynchronization command.

FIG. 4 shows examples of the response from the storage device when the pair resynchronization command and pair swap resynchronization command, which are pair volume control commands, are executed. For example, when the pair resynchronization command is the command executed, if the executing volume is the primary volume and is not in the suspended state (normal), the response from the storage device is not a normal end.

When the executing volume is in the copying state or paired state, that pair resynchronization command ends abnormally. Also, for the pair swap resynchronization command, if the executing paired volume is the secondary volume and is not in the suspended state (normal), the response from the storage device is not a normal end.

When the executing volume is in the copying state or paired state, that command ends abnormally. Using the properties of these paired volumes, the paired volume control software receives SCSI commands issued from the cluster software and analyzes those SCSI commands. As a result, when the SCSI command is one requiring exclusive processing between paired volumes such as the reserve command, this software combines the SCSI command with a paired volume control command, for example, the pair resynchronization command and issued to the storage device side.

When the pair resynchronization command is executed in the storage devices and the paired volume state can be normally transitioned, the normal end status is sent to the paired volume control software. Then, the paired volume control software which received the normal end status returns the normal end status to the cluster software.

The cluster software which received the normal end status is authorized to continue within the clustering system and executes a fail-over. Meanwhile, because the pair resynchronization command from one host device is initially executed on the storage device and the state of the paired volume changes to the paired state, another pair resynchronization command will end abnormally if the another command issued from another host device to the paired state volume shown in FIG. 4.

Having received notification of the abnormal end of the paired volume control command, the paired volume control software returns the abnormal end status to the cluster software to report that the SCSI command request failed. Having received the abnormal end status, the cluster software is not authorized to continue in the clustering system and is caused to halt all applications and services under the cluster software control.

Figure 5:
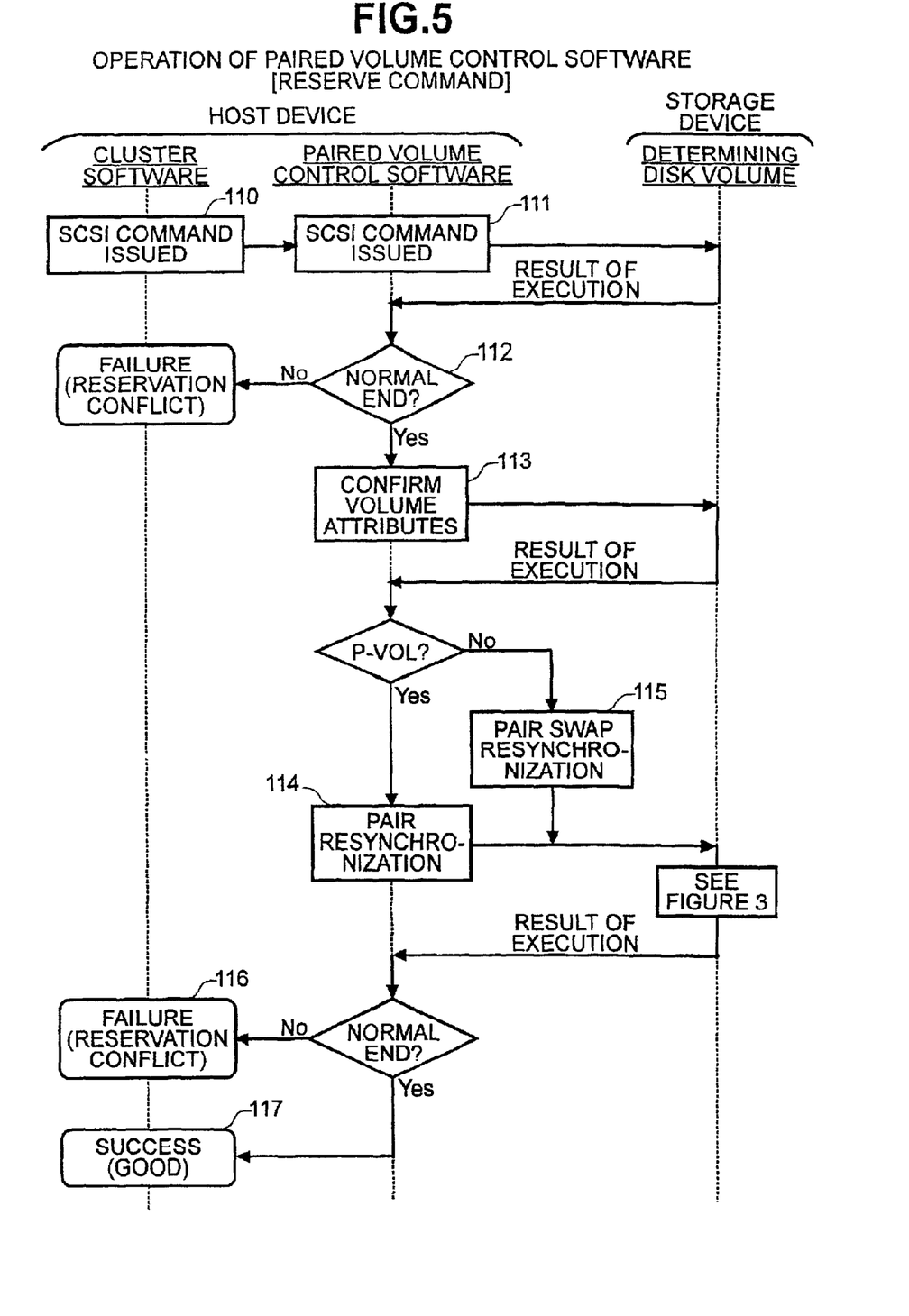
FIG. 5 shows the operation of the paired volume control software when the SCSI reserve commands are received.
Figure 6:
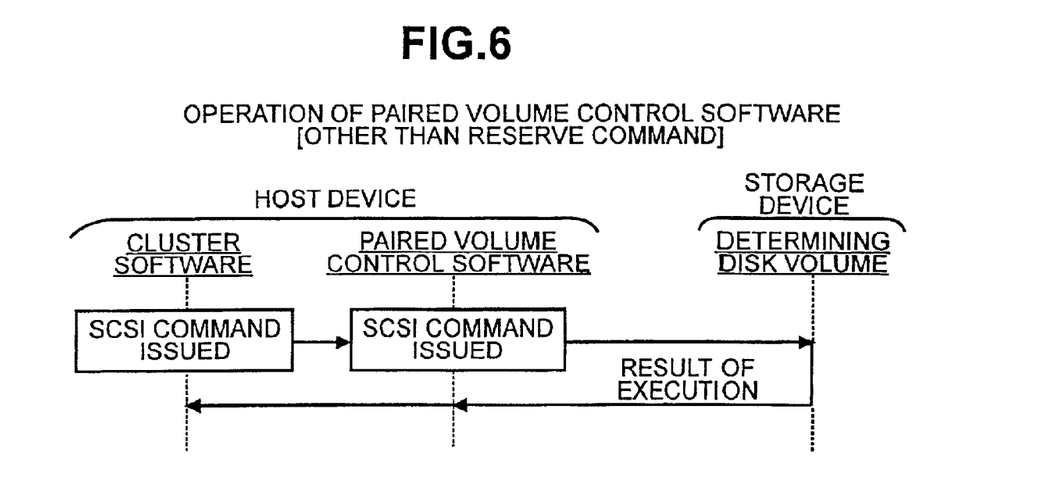
FIG. 6 shows the operation of the paired volume control software when commands other than the SCSI reserve command are received.

In FIGS. 5 and 6, about the operations of the paired volume control software 84 and 85 proposed in the present invention, the case of receiving the SCSI reserve command and the case of receiving a command other than that are further explained in detail. In the case where the SCSI commands issued from the cluster software 80 is reserve commands (110), the paired volume control software 84 issues a SCSI reserve command to the primary volume (P-VOL) or secondary volume (S-VOL) of the determining paired volumes (111).

In the case where the result of executing the SCSI reserve commands is abnormal end (good status) (112), a volume attribute confirmation command is issued to the storage device (113) to check whether the volume is a primary volume (P-VOL) or secondary volume (S-VOL) of the determining paired volumes. The pair resynchronization command is further issued (114) in the case where the determining volume is the primary volume (P-VOL).

Meanwhile, a pair swap resynchronization command is issued (115) in the case where the determining volume is the secondary volume (S-VOL). Here, the pair resynchronization command is the command which resynchronizes the paired volumes in the suspended state and transitions the volumes to a paired state.

On the other hand, the pair swap resynchronization command is the command which resynchronizes the paired volumes in the suspended state, transitions the volumes to a paired state, and swaps the primary volume for the secondary volume and secondary volume for the primary volume. The determining volume on the local site, which was the secondary volume, thereby transitions to the primary volume.

As shown in FIG. 4, the pair resynchronization command succeeds (130) only in the case where the volume under the control of the cluster software is the primary volume (P-VOL) and is in the suspended state (normal).

Meanwhile, the pair swap resynchronization command succeeds only in the case where the volume is the secondary volume (S-VOL) and is in the suspended state (normal) (131).

Also, as shown in FIG. 3, when either of the pair resynchronization command or the pair swap resynchronization command is issued first and is in an executing state, the state of the paired volumes changes from the suspended state (normal) (120) to the copying state (121), and after the completion of copying, then to the paired state and (122). Accordingly, as shown in FIG. 4, the pair resynchronization command or the pair swap resynchronization command which is subsequently executed after the paired state becomes the paired state, ends abnormally.

In the case where the pair resynchronization or pair swap resynchronization command ends normally, the paired volume control software returns a good status (success) to the host device (117), which means exclusive usage rights over the cluster were acquired.

On the other hand, in the case when the paired volume control commands end abnormally, the control software returns a reservation conflict status (failure) to the host device (116) in order to report that reservation failed, meaning that exclusive usage rights over the cluster were not acquired.

The host device which attained the good status for a reserve request to the determining volume executes a fail-over and takes over all resources, applications, and services in the cluster.

On the other hand, a host device which attained the reservation conflict status releases resources that it was administering, and halts all applications and services that it was administering.

Also, as shown in FIG. 6, in the case where the SCSI command issued by the cluster software 80 and 81 was a command other than the reserve command, the paired volume control software does not add a paired volume control command and issues the pertinent SCSI command in its original condition to the determining volume.

Figure 7:
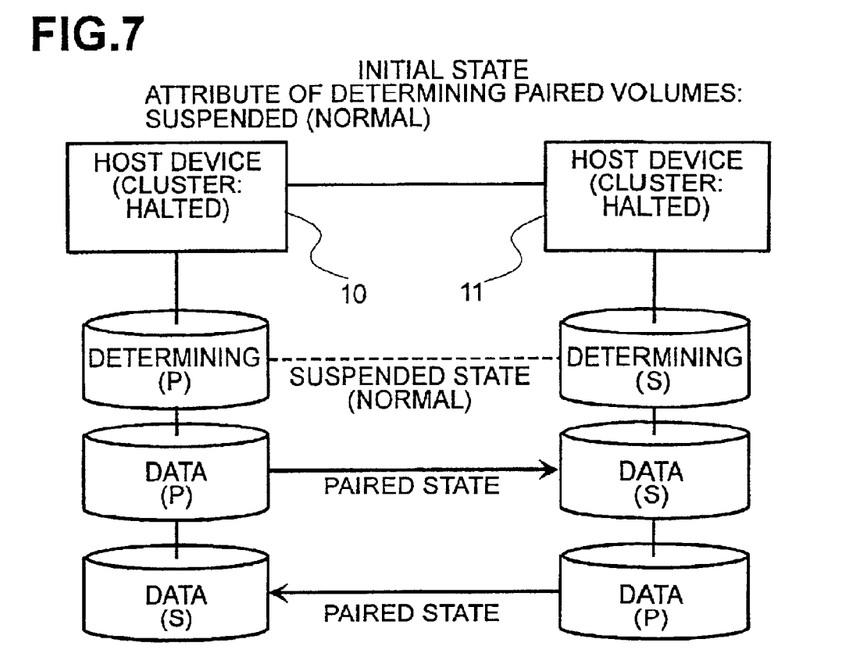
FIGS. 7 through 13 show the operations of the clustering system having determining paired volumes.

With FIGS. 7 through 13, a series of operations from a normal status, a failure generation, and the clustering function being executed are explained. In the initial state, the clustering system is halted and the determining paired volumes continue in the suspended state (normal) (FIG. 7).

Here, in the case where the user starts the clustering system, the cluster software in each host device issues a SCSI reserve command to the paired volume control software in order to acquire exclusive usage rights in the clustering system. The paired volume control software which received the SCSI reserve command issues the SCSI reserve command to the primary volume (determining P-VOL) or secondary volume (determining S-VOL) of the determining paired volumes and compete for exclusive usage rights on the site. In this example, because only one host device is present in each site, the SCSI reserve commands issued by the host devices 10 and 11 are both successful.

Next, the paired volume control software connected to the primary volume (determining P-VOL) side of the determining paired volumes issues the pair resynchronization command. Meanwhile, the paired volume control software connected to the secondary volume (determining S-VOL) side of the determining paired volumes issues the pair swap resynchronization command.

Figure 8:
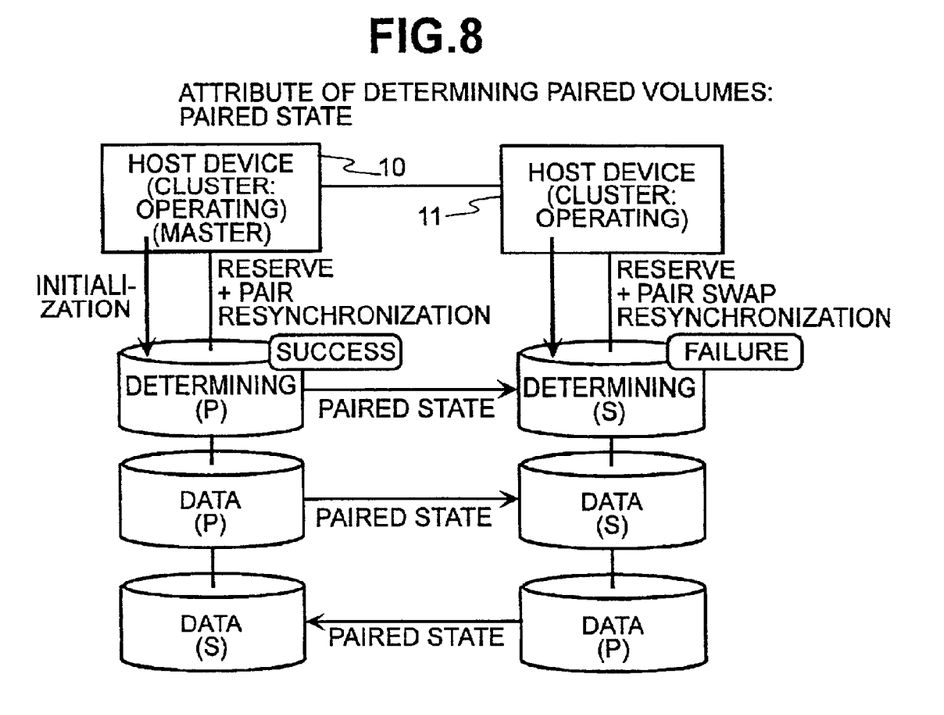

In this example, the pair resynchronization command of the host device 10 is issued before the pair swap resynchronization command of the host device 11 and the host device 10 acquires exclusive usage rights over the cluster. The cluster software within the host device 10 which acquired exclusive usage rights issues a write command to the determining paired volumes and initializes the cluster administration information (FIG. 8).

Figure 9:
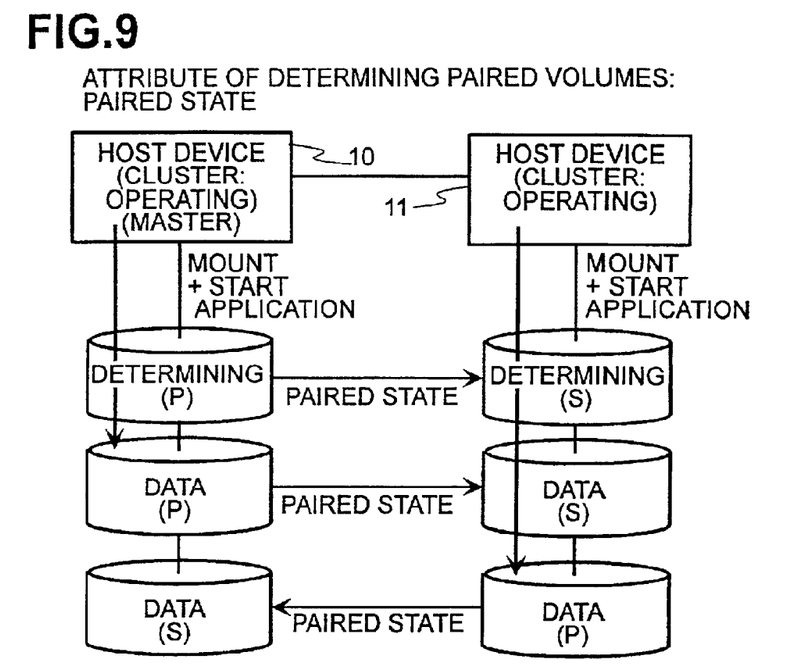

Next, the cluster software in each host device mounts the data volume previously established by the user and starts applications for that data volume (FIG. 9).

Figure 10:
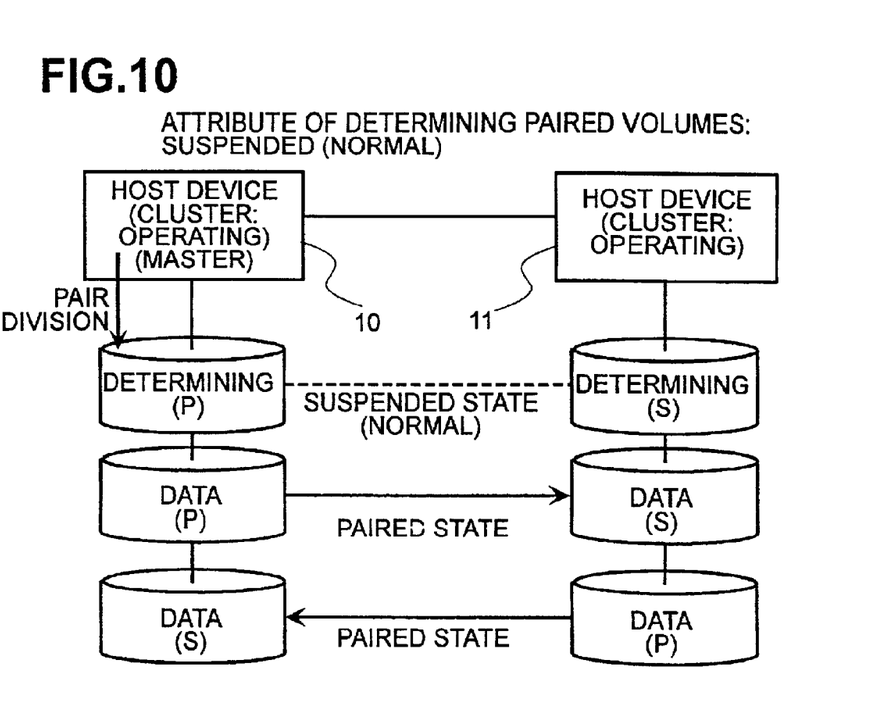
Figure 11:
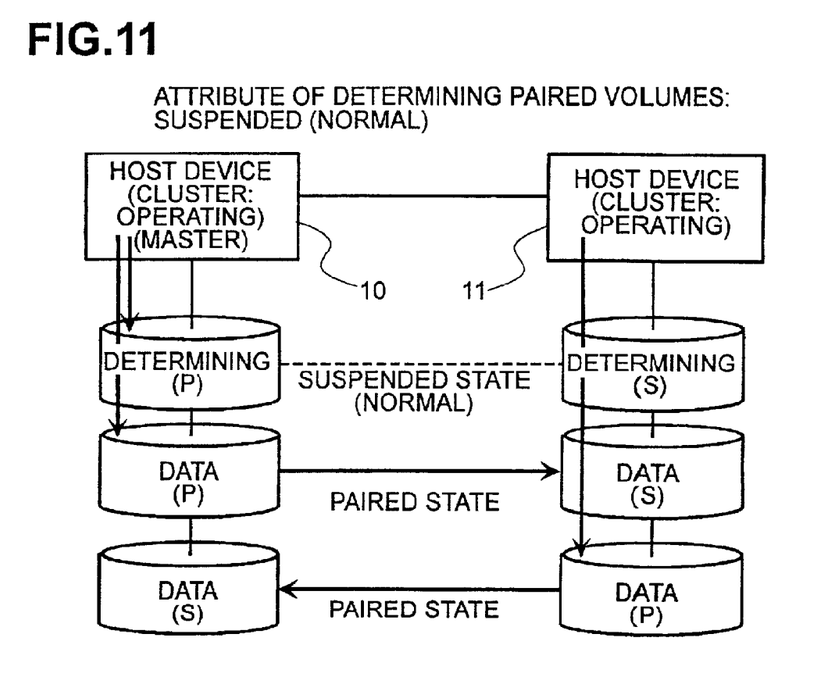

For managing a hazard status, the host devices divides the determining paired volumes using the paired volume control software to change its status to "the suspended state (normal)" (FIG. 10). Then, the system commence normal operations (FIG. 11).

In the case where a failure of a host device or the network occurs during normal operations and heartbeat communication becomes impossible, the cluster software in each host device issues a SCSI bus device reset and resets the data transfer interfaces, and then issues a SCSI reserve command to the paired volume control software, in order to acquire exclusive usage rights in the clustering system. The paired volume control software which received the SCSI reserve command issues a SCSI reserve command to the primary volume (determining P-VOL) or secondary volume (determining S-VOL) of the determining paired volume and competes for exclusive usage rights on the site.

Because in this example only one host device is present on each local site, the SCSI reserve commands on the sites issued by the host devices 10 and 11 succeed normally. The paired volume control software connected to the primary volume (determining P-VOL) side of the determining paired volumes issues a pair resynchronization command.

Figure 12:
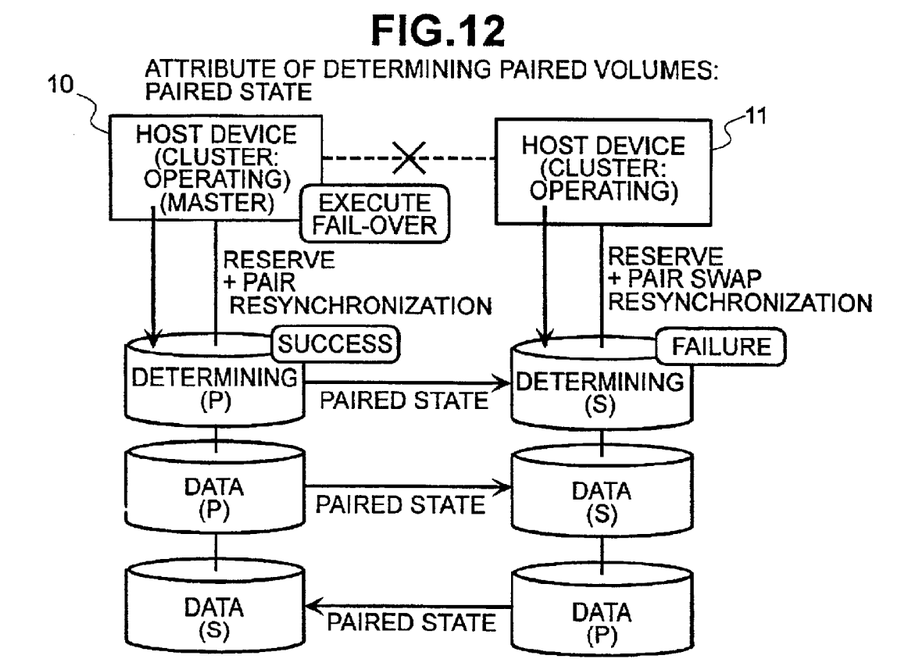

Meanwhile, the paired volume control software connected to the secondary volume (determining S-VOL) of the determining paired volumes issues a pair swap resynchronization command. In this example, the pair resynchronization command from the host device 10 is issued before the command from the host device 11 and acquires exclusive usage rights over the cluster (FIG. 12).

Figure 13:
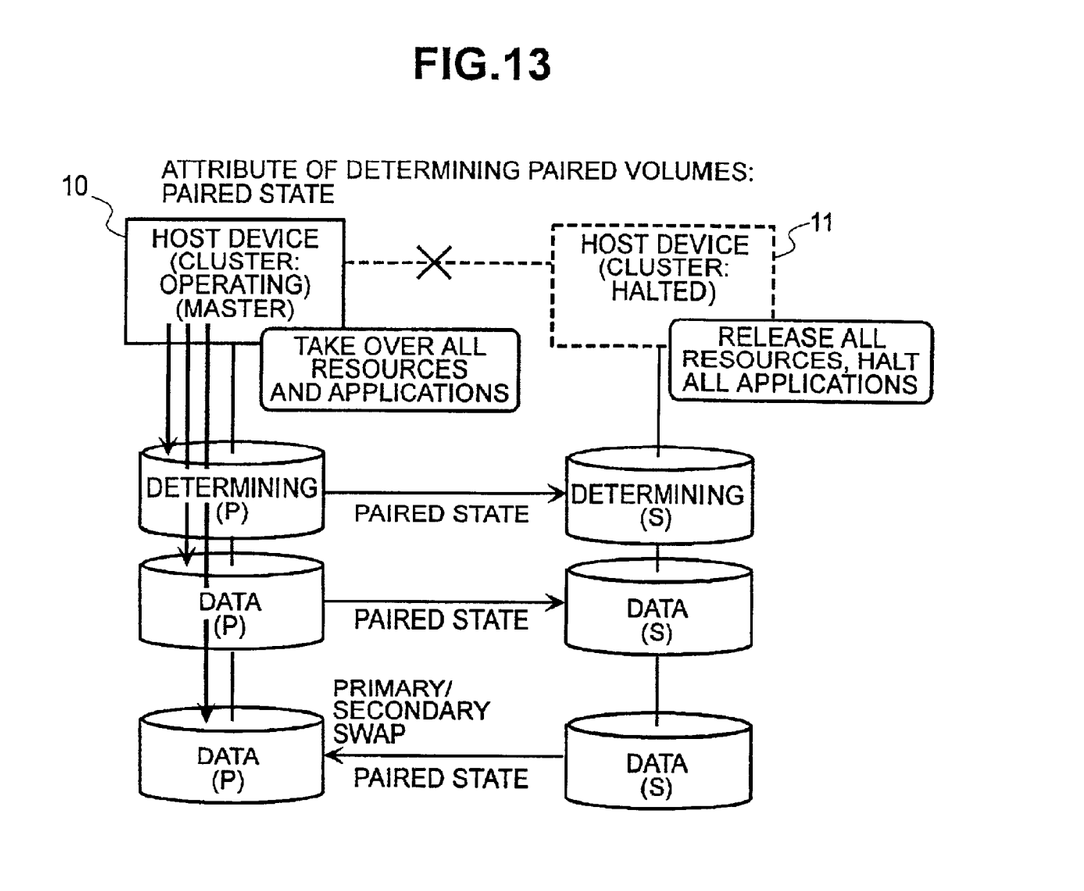

The cluster software in the host device 10 which acquired exclusive usage rights takes over applications and resources such as disk volumes on the other host device and executes a fail-over. Meanwhile, the host device, whose SCSI reserve command to the determining volume failed, halts all applications and services running on that host device (FIG. 13).

In this way, with the present invention, one host device has exclusive control of the pertinent paired volumes, being paired volumes generated between two separately established storage devices having a remote copy function, and can cause the paired volumes to be recognized as a single volume by a plurality of host devices by denying update requests from other host devices. The pertinent paired volumes can be used as the determining volume for a clustering system.

What is claimed is:

1. A clustering system comprising:
   a first cluster including a first host device and a first storage device coupled to the first host device;
   a second cluster including a second host device and a second storage device coupled to the second host device;
   a heartbeat network coupled to each of the first and second host devices;
   a remote copy interface coupling the first and second storage devices;
   clustering software to control fail over between the first and second host devices is configured in each of the first and second host devices;
   paired volume control software to issue a pair control command configured in the first and second host devices; and
   a determining volume is provided in each of the first and second storage devices;
   wherein the clustering software, when it detects a failure by monitoring the heartbeat, issues a selected command to the paired volume control software requiring an exclusive process between paired volumes;
   wherein the paired volume control software issues the pair control command to the determining volume when receiving the selected command from the clustering software;

wherein the paired volume control software receiving a normal end status returns normal end status to the clustering software; and wherein the clustering software receiving the normal end status from the pair volume control software starts a fail over process.

2. A clustering system as in claim 1 wherein the heartbeat network allows each of the first and second hosts to monitor an operating condition of the other of the first and second hosts.

3. A clustering system as in claim 1 wherein the remote copy interface allows write operation to the first storage device to be mirrored to the second storage device.

4. A clustering system as in claim 1 wherein the selected command comprises a SCSI reserve command.

5. A clustering system as in claim 4 wherein the clustering software which failed to reserve the determining volume releases its resources and halts running application programs.

6. A clustering system as in claim 4 wherein if the SCSI reserve command is properly executed, and if the determining volume is a primary volume, a pair resynchronization command is issued.

7. A clustering system as in claim 6 wherein if the SCSI reserve command is properly executed, and if the determining volume is a secondary volume, a pair swap resynchronization command is issued.

* * * * *